US011023433B1

(12) United States Patent
Datta et al.

(10) Patent No.: US 11,023,433 B1
(45) Date of Patent: Jun. 1, 2021

(54) SYSTEMS AND METHODS FOR BI-DIRECTIONAL REPLICATION OF CLOUD TIERED DATA ACROSS INCOMPATIBLE CLUSTERS

(71) Applicant: EMC Corporation, Hopkinton, MA (US)

(72) Inventors: Pankaj Datta, Acton, MA (US); Darrick P. Lew, Seattle, WA (US); Bharat Sharma, Redmond, WA (US)

(73) Assignee: EMC CORPORATION, Hopkinton, MA (US)

( * ) Notice: Subject to any disclaimer, the term of this patent is extended or adjusted under 35 U.S.C. 154(b) by 281 days.

(21) Appl. No.: 14/986,309

(22) Filed: Dec. 31, 2015

(51) Int. Cl.
*G06F 16/21* (2019.01)
*G06F 16/27* (2019.01)
*G06F 16/28* (2019.01)

(52) U.S. Cl.
CPC ......... *G06F 16/219* (2019.01); *G06F 16/275* (2019.01); *G06F 16/285* (2019.01)

(58) Field of Classification Search
CPC ......... G06F 17/30309; G06F 17/30581; G06F 17/30598; G06F 17/30174; G06F 17/3023
USPC ........................................................ 707/638
See application file for complete search history.

(56) References Cited

U.S. PATENT DOCUMENTS

| 8,484,163 B1 * | 7/2013 | Yucel | G06F 17/30289 |
| | | | 370/216 |
| 9,043,567 B1 * | 5/2015 | Modukuri | G06F 3/0665 |
| | | | 711/162 |
| 2005/0021566 A1 | 1/2005 | Mu | |
| 2006/0218135 A1 | 9/2006 | Bisson et al. | |
| 2007/0019520 A1 | 1/2007 | Isozaki et al. | |
| 2008/0306986 A1 * | 12/2008 | Doyle, Sr. | G06F 8/51 |
| 2009/0249005 A1 | 10/2009 | Bender et al. | |
| 2009/0300079 A1 * | 12/2009 | Shitomi | G06F 3/0605 |
| 2010/0274772 A1 * | 10/2010 | Samuels | G06F 16/188 |
| | | | 707/693 |
| 2010/0332454 A1 * | 12/2010 | Prahlad | G06F 3/0649 |
| | | | 707/654 |
| 2011/0264870 A1 * | 10/2011 | Ylonen | G06F 12/0261 |
| | | | 711/154 |
| 2013/0110790 A1 * | 5/2013 | Matsumoto | G06F 12/00 |
| | | | 707/679 |

(Continued)

OTHER PUBLICATIONS

Office Action dated Jun. 29, 2018 for U.S. Appl. No. 14/981,695, 41 pages.

*Primary Examiner* — Hosain T Alam
*Assistant Examiner* — Nicholas E Allen
(74) *Attorney, Agent, or Firm* — Amin, Turocy & Watson, LLP

(57) ABSTRACT

Data sets are synchronized between two or more clusters of nodes that support different versions of files (e.g., stub files) within a distributed file storage system. Moreover, the distributed file storage system employs a tiered cloud storage architecture. In one aspect, for stub files having versions that are not commonly supported by the two or more clusters, an application protocol interface (API) is utilized that employs a deep-copy process wherein cloud-backed data referenced by a stub file is retrieved from a cloud storage (e.g., public cloud) and sent by a primary cluster to one or more secondary clusters. Moreover, the API can determine an optimal synchronization process on a per-file basis.

20 Claims, 8 Drawing Sheets

(56) References Cited

U.S. PATENT DOCUMENTS

| | | | |
|---|---|---|---|
| 2013/0238554 A1* | 9/2013 | Yucel | G06F 16/21 |
| | | | 707/610 |
| 2013/0311551 A1* | 11/2013 | Thibeault | G06F 9/5055 |
| | | | 709/203 |
| 2014/0006858 A1* | 1/2014 | Helfman | G06F 11/1448 |
| | | | 714/19 |
| 2014/0046900 A1* | 2/2014 | Kumarasamy | G06F 11/1489 |
| | | | 707/620 |
| 2014/0149476 A1* | 5/2014 | Kishimoto | G06F 16/1748 |
| | | | 707/827 |
| 2014/0181443 A1* | 6/2014 | Kottomtharayil | G06F 11/1458 |
| | | | 711/162 |
| 2014/0201141 A1 | 7/2014 | Vibhor et al. | |
| 2014/0201144 A1* | 7/2014 | Vibhor | H04L 29/0854 |
| | | | 707/634 |
| 2014/0337285 A1* | 11/2014 | Gokhale | G06F 11/1464 |
| | | | 707/610 |
| 2014/0358856 A1* | 12/2014 | Shitomi | G06F 3/061 |
| | | | 707/626 |
| 2015/0212896 A1* | 7/2015 | Pawar | G06F 11/1448 |
| | | | 707/648 |
| 2015/0243984 A1* | 8/2015 | Kase | C01G 53/00 |
| | | | 429/223 |
| 2015/0372938 A1* | 12/2015 | Patel | H04L 47/70 |
| | | | 709/226 |
| 2015/0379107 A1* | 12/2015 | Rank | G06F 16/275 |
| | | | 707/611 |
| 2016/0004720 A1* | 1/2016 | Tabaaloute | G06F 16/178 |
| | | | 707/639 |
| 2016/0139836 A1 | 5/2016 | Nallathambi et al. | |

\* cited by examiner

SYSTEMS AND METHODS FOR BI-DIRECTIONAL REPLICATION OF CLOUD TIERED DATA ACROSS INCOMPATIBLE CLUSTERS

TECHNICAL FIELD

The subject disclosure relates generally to systems and methods for bi-directional replication of cloud tiered data across incompatible clusters.

BACKGROUND

As cloud storage begins to proliferate, a large growth in utilization of cloud storage by cloud storage providers, organizations, and individuals alike with data storage needs both large and small has been observed. An organization that maintains privately owned data center(s) that hosts data of the organization can tier some of their data to a public cloud while still maintaining a set of data in their private data center, for example, to reduce storage-related costs. Typically, the tiered data can be replicated over one or more clusters within the privately owned data center(s) for redundancy incase of failure of one of the clusters. However, managing replication of such tiered data across incompatible clusters can become significantly complicated. For example, legacy clusters may not support tiered data storage. Further, different clusters can support different versions of tiered data storage files. In these scenarios, the source cluster cannot send tiered data storage files and/or their metadata via the requisite messages since the target cluster does not support them. Additionally, replication between incompatible clusters based on conventional processes can lead to only a portion of the tiered data storage file that resides within the privately owned data center(s) being copied from a source cluster to a target cluster. This results in a file that is unusable by end users.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

The systems and methods disclosed herein relate to efficient replication of file data between a primary cluster and a backup cluster. In one aspect, a system is disclosed that comprises a processor and a memory that stores executable instructions that, when executed by the processor, facilitate performance of operations. In one aspect, the operations comprise determining version data indicative of a version of a stub file supported by a target cluster device and determining, based on the version data, a type of replication that is to be performed to copy the stub file retained within a source cluster device to the target cluster device.

One embodiment of the specification relates to a method that comprises determining, by a system comprising a processor, compatibility data for a stub file that is to be copied from a source cluster device to a target cluster device. The compatibility data is determined based on version data indicative of a set of versions of stub files that are commonly supported by the source cluster device and the target cluster device. Further, the method comprises determining, based on the compatibility data, a type of synchronization operation that is to be performed to copy the stub file from the source cluster device to the target cluster device.

Another embodiment of the specification relates to a computer-readable storage medium comprising instructions that, in response to execution, cause a device comprising a processor to perform operations, comprising determining compatibility data that indicates that a first cluster device supports cloud-tiered files and a second cluster device does not support cloud-tiered files and facilitating a synchronization of a file of the cloud-tiered files between the first cluster device and the second cluster device. In one aspect, the file comprises a data structure employable to reference content retained within a network storage device.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
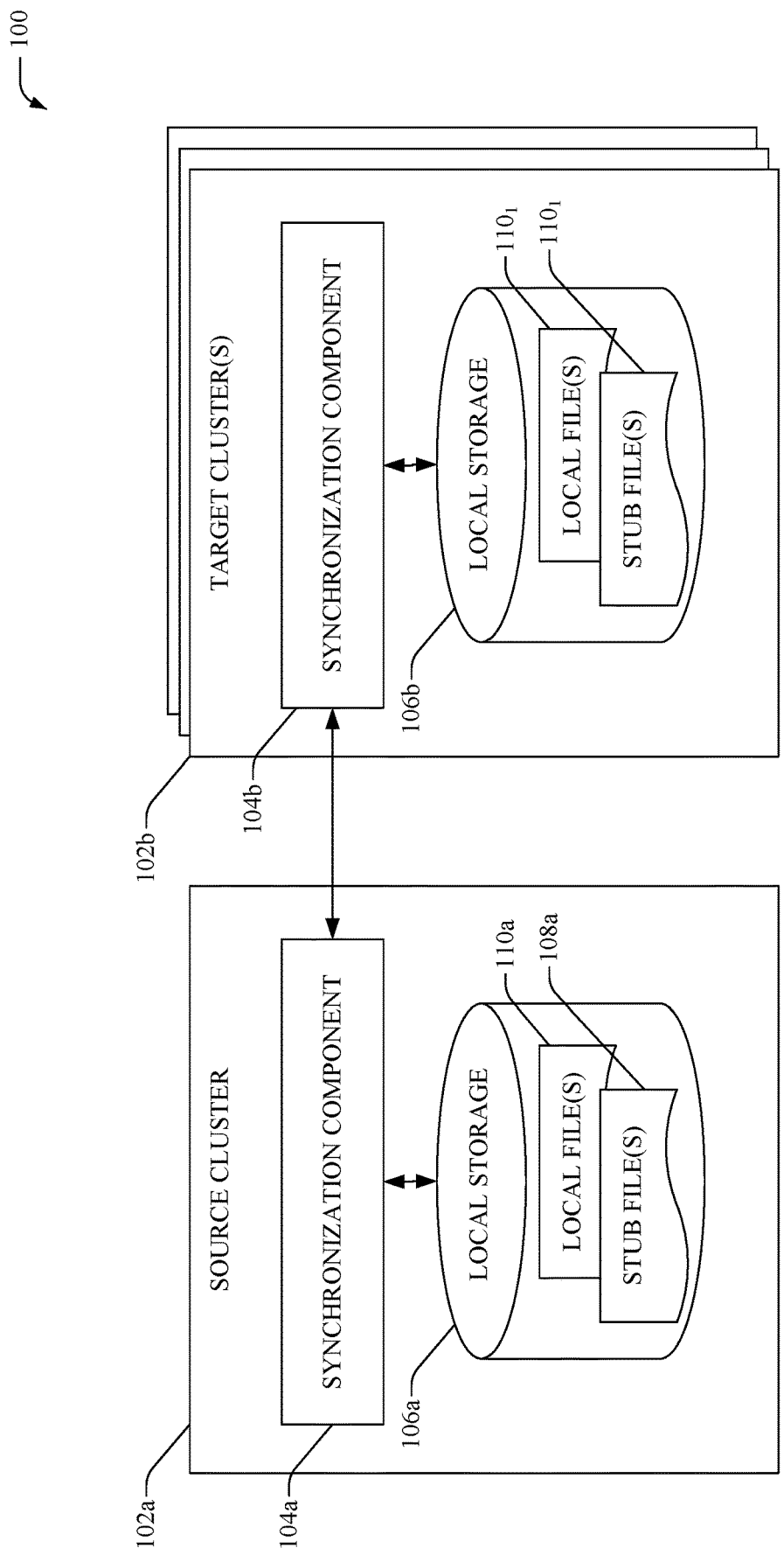
FIG. 1 illustrates an example system that facilitates data synchronization between incompatible clusters within a distributed file storage system.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloudpool" as used herein refers to a pool of cloud storage accounts in which data can be tiered to from a private storage infrastructure. It can also refer to a cloud storage provider instance, for example, a Microsoft Azure storage subscription, and Amazon S3 account, or an EMC Isilon RAN namespace access point. A single cloudpool can contain accounts from multiple cloud providers and/or multiple accounts from a single cloud provider.

The terms "primary storage," "local storage," and/or "private storage" refer to a data storage system that is the primary access point for stored data. In most implementations, primary storage is private infrastructure operated on the premises of the data storage client. In one implementation, the primary storage can be an EMC Isilon Cluster.

The term "stub," "stub file," "smartlink," and/or "smartlink file" are used interchangeably herein and refer to the remnant of a file in local storage after its data content is moved to cloud storage. The stub can contain original system metadata, user metadata, additional metadata necessary to manage the stub file and associated data objects, and/or mapping information that provides a location of the cloud data objects that contain the original file content. In some implementations, the stub can contain locally cached data obtained from the cloud. It can be appreciated that until all the content of the file is fully reconstituted from cloud storage, the file can remain a stub. The stub file can contain information about the tiered data's compression state and/or encryption state. In one implementation, the stub file can contain mappings to one cloud object containing the metadata (e.g., Cloud Metadata Object as defined below). The term "local file" as used herein refers to a regular non-stubbed file.

The term "local data cache," or "local cache," or "locally cached data" refers to data obtained from cloud storage and stored in local storage that is associated with a stubbed file. A local data cache can be a specific area of storage space within a clustered file system and is not limited to a specific type of storage device such as solid-state storage, flash storage or magnetic storage.

The term "Cloud Metadata Object" or "CMO" refers to the cloud object containing metadata information relating to tiered data. The CMO can contain reverse links to the original file in local storage, the same mapping information that is stored in the stub file, pertinent policy information related to the file such as retention period, encryption information, compression information, and original file system metadata information. In one implementation, the CMO can also itself be encrypted and/or compressed. One example CMO data structure includes an encrypted file path, a compression flag, the local storage logical mode (LIN) of the stub (e.g., includes in-memory representation of on-disk data structures that may store information, or metadata, about files and directories, such as file size, file ownership, access mode (read, write, execute permissions), time and date of creation and modification, file types, data protection process information, snapshot information, hash values associated with location of the file, a flag indicating the LIN is associated with a stub file, mappings to cloud data objects, pointers to a cloud metadata objects, etc.), the local file path, statistical information on the file, a checksum, mapping information (e.g., includes cloud storage account, object identifier, snapshot identifier, index number, length/size of the object, etc.).

Further, the term "cloud" as used herein can refer to a set of network servers, communicatively and/or operatively coupled to each other, that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

The systems and methods disclosed herein relate to synchronizing data sets between two or more clusters of nodes (referred herein as clusters) that support different versions of files of a distributed file storage system. In one aspect, data synchronization is provided in example scenarios wherein primary and secondary clusters support different versions of stub files and/or wherein one of the clusters does not support stub files. In one embodiment, for incompatible clusters, an application protocol interface (API) is utilized that employs a deep-copy process wherein cloud-backed data is retrieved from a cloud storage (e.g., public cloud) and sent by the primary cluster to the secondary cluster. Moreover, the API can determine an optimal synchronization process on a per-file basis.

Referring initially to FIG. 1, there illustrated is an example system 100 that facilitates data synchronization between incompatible clusters within a distributed file storage system, according to one or more aspects of the disclosed subject matter. System 100 can include a source cluster 102a and one or more target cluster(s) 102b that are employed to provide redundancy during failure events, such as, but not limited to a failover, a switchover, etc. In one example, data files associated with (e.g., retained within and/or referenced via) the source cluster 102a can be replicated to the target cluster(s) 102b, such that upon the occurrence of the failure event, clients can be actively migrated (e.g., during ongoing file system activity) from the source cluster 102a to the target cluster(s) 102b. A set of clients, for example, Network File System (NFS) clients, can connect to source cluster 102a via a network interface and subsequent to the failure event, the clients can connect to the target cluster(s) 102b and access mirrored copies of the data, stored on the target cluster(s) 102b, that the client was expecting to access via the original source cluster 102a.

It is noted that subject disclosure relates to cluster wide failure, such that the entire source cluster of nodes 102a experiences a failure, or some other triggering event occurs, providing for clients to failover to a separate cluster of nodes (e.g., target cluster 102b) running a separate instance of the base operating system. This is different from a node failure, wherein, clients among a cluster of nodes can failover to a different node among the same cluster.

In one aspect, the synchronization components 104a and 104b can be utilized to facilitate replication of data files from the source cluster 102a to the target cluster(s) 102b. As an example, the data files can be retained within local storage 106a and can include stub files 108a and/or local files 110a. Typically, stub files 108a comprise metadata indicative of a control structure having a format that is specific to the version of the stub files and/or operating system. According to an aspect, prior to the replication, the synchronization component 104a can determine version data indicative of the stub file versions supported by the target cluster 102b. As an example, a stub version can comprise: (i) a flag that is a bitwise OR of features that are used by the stub file. The features can include, but are not limited to, the particular provider, compression schemes, encryption schemes, etc. that are used when creating the file; (ii) a number that indicates how recent is a change. This example makeup allows smaller version sets to be supported as compared to a pure numbering scheme and allows efficient determination of capabilities that are supported by a stub file.

In one example, the version data can be received by the synchronization component 104a via one or more messages transmitted by the synchronization component 104b. In another example, the version data can be received by the synchronization component 104a via one or more bits of a flag accessed via or received from the synchronization component 104b. For example, if a flag bit has been set, the synchronization component 104a can determine that the target cluster 102b supports stub files and if the flag bit has not been set, the synchronization component 104a can determine that the target cluster 102b supports only local files. Further, additional data regarding different versions of stub files supported by the target cluster 102b can be specified by setting different bits in a flag. Typically, different versions of stub files employ different structures of mandatory metadata (e.g., mapinfo and/or, cacheinfo data structures that are employed to interpret on-cloud and on-disk data respectively, described more in detail infra), different compression and/or encryption formats for on-cloud data, different cloud-providers, etc.

According to an embodiment, based on the version data, the synchronization component 104a can identify common versions of stub files supported by the source cluster 102a and the target cluster 102b. Further, for each file that is to be replicated (e.g., stub files 108a), the synchronization component 104a can verify whether the version of file is commonly supported by both clusters (102a, 102b). As an example, if the version of the file is commonly supported by both clusters (102a, 102b), the synchronization component 104a can copy the file data (e.g., stub files 108a) from local storage 106a to local storage 106b (e.g., stored as corresponding stub files 108b and/or local files 110b). Alternatively, if both clusters (102a, 102b) do not commonly support the version of the file, the synchronization component 104a can perform a deep-copy process that retrieves the missing content referenced by the file from cloud storage (e.g., a public cloud) and transfers the content to synchronization component 104b. The synchronization component 104b can then store the content as a local file 110b within local storage 106b (or as modified content within an existing stub file 108b). Typically, configuration information (e.g., account information, provider information, policy information, etc.) associated with the file is not automatically copied during the deep-copy process and can be manually updated on the target cluster 102b.

In an example scenario, wherein the source cluster 102a supports on-disk versions 1 and 2, and the target cluster 102b only supports version 1, if the stub file 108a stored in the source cluster 102a is stored in the version 1 format, a stub synchronization process can be performed. During the stub synchronization process only the metadata (e.g., control structures, account information, provider information, policy information etc.) and cached data (if any) in the stub are replicated from the source cluster 102a to the target cluster 102b. However, if the stub file 108a was upgraded since the last successful synchronization and is now stored in the version 2 format, the deep-copy process can be performed. In another example scenario, wherein the target is upgraded and supports versions 2 and 3, but not version 1, if the stub file on the source cluster 102a is stored in the version 2 format, a stub synchronization process can be performed. However, if the file is stored in the version 1 format, a deep-copy is performed since the target cluster 102b can no longer support version 1.

It is noted that during an initial synchronization, all the data stored within local storage 106a (or referenced by the stub files 108a and stored within cloud storage) can be copied to local storage 106b; however, during each subsequent synchronization, only modifications and/or changes to the data are copied (e.g., to conserve computing and/or transmission resources). In one aspect, during the subsequent synchronizations the synchronization component 104a can determine changes that have been made to the file data within local storage 106a, for example, based on a comparison of snapshots of the local storage 106a taken during or subsequent to the initial (or previous) synchronization and taken at a current time (prior to the subsequent synchronization).

During a failure event (e.g., failover) associated with a failure of the source cluster 102a, clients can be routed to the target cluster 102b and can be provided access to file data retained within local storage 106b and/or file data retained within cloud storage referenced via stub files 108b. In one example scenario, the clients can update and/or modify data within the local storage 106b. Further, the clients can delete one or more of the stub files 108b and/or local files 110b and/or create new stub files 108b and/or local files 110b. In addition, one or more stub files 108b can be converted to local files 110a and/or vice versa. When the failure event is resolved (e.g., source cluster is healthy and/or active), the synchronization component 104b can transfer a copy of these updates and/or modifications to the local storage 106a via synchronization component 104b. Moreover, synchronization component 104b can perform the synchronization on a per file basis, such that, if the version of the file is commonly supported by both clusters (102a, 102b), the synchronization component 104b can copy the modified file data (e.g., stub files 108b and/or local files 110b) from local storage 106b to local storage 106a (e.g., stored as corresponding stub files 108a and/or local files 110a). Alternatively, if the version of the file is not commonly supported by both clusters (102a, 102b), the synchronization component 104b can perform a deep-copy process that retrieves the modified content referenced by the file from cloud storage (e.g., a public cloud) and transfers the modified content to synchronization component 104a, which then stores the content as a local file 110a. It is noted that for newly created files, the entire file data stored within local storage 106b (or referenced by the stub files 108b and stored within cloud storage) can be copied to local storage 106a.

It is noted that the local storage 106a and/or local storage 106b can include volatile memory(s) or nonvolatile memory(s), or can include both volatile and nonvolatile memory(s). Examples of suitable types of volatile and non-volatile memory are described below with reference to FIG. 8. The memory (e.g., data stores, databases) of the subject systems and methods is intended to comprise, without being limited to, these and any other suitable types of memory.

Figure 2:
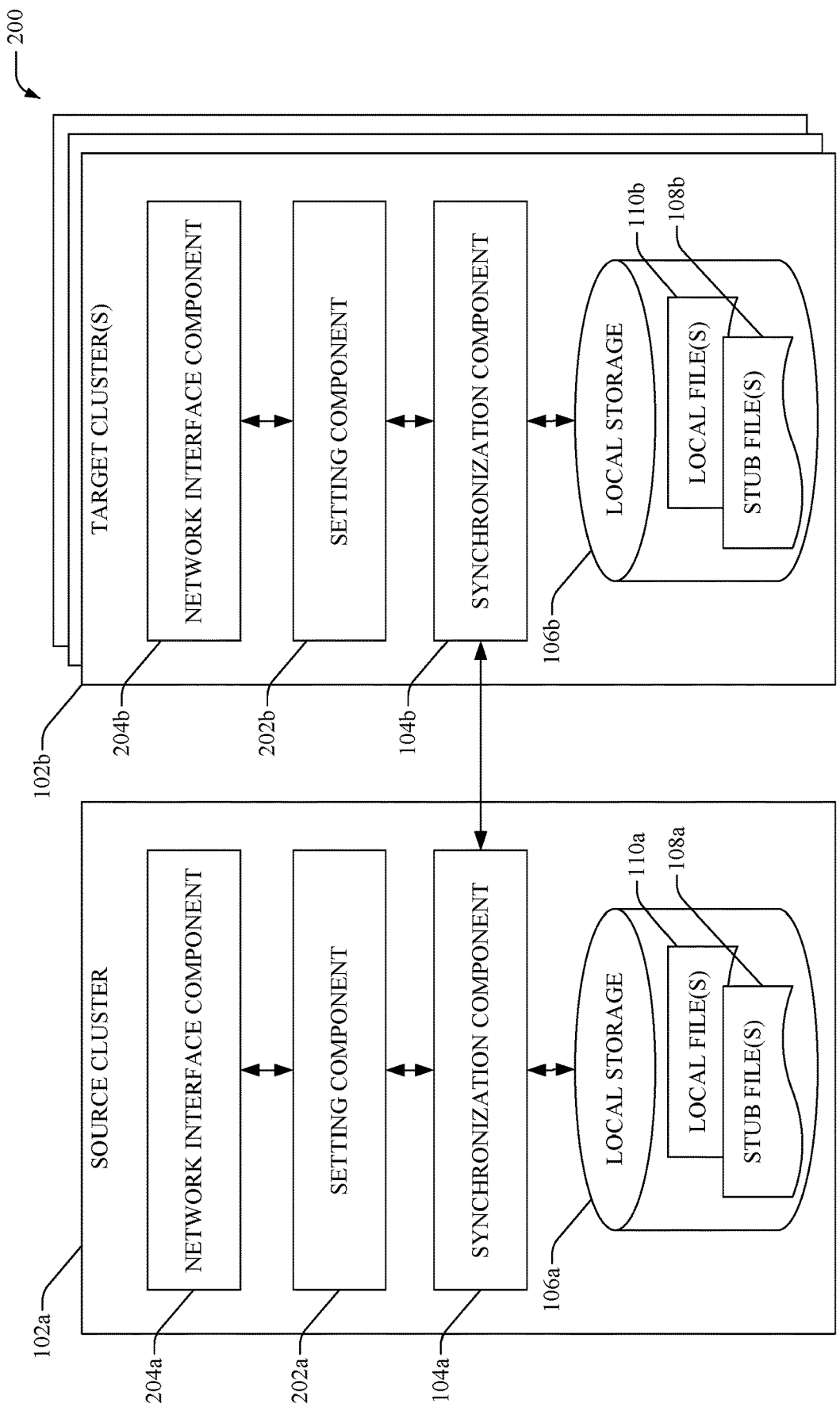
FIG. 2 illustrates an example system for settings-based synchronization between incompatible clusters.

Referring now to FIG. 2, there illustrated is an example system 200 for settings-based synchronization between incompatible clusters, in accordance with an aspect of the subject disclosure. In one aspect, system 200 can enable network providers to manage replication of data between clusters. It is noted that the source cluster 102a, target cluster(s) 102b, synchronization component 104a, synchronization component 104b, local storage 106a, local storage 106b, stub file(s) 108a, stub file(s) 108b, local file(s) 110a, and local file(s) 110b can include functionality as more fully described herein, for example, as described above with regard to system 100.

In one aspect, preferences, settings, and/or policies for data synchronization can be stored and implemented by setting components 202a, 202b. As an example, the setting can be defined (and/or modified) via the respective network interface components 204a, 204b, for example, by a network provider and/or client. The setting components 202a, 202b can determine a type of replication that is to be performed based on the preferences, settings, and/or policies. As an example, replication types can include a deep-copy replication or a stub synchronization replication. During the deep-copy replication, the cloud-backed data is retrieved from the cloud storage and sent by the source cluster 102a to the target cluster 102b (e.g., via synchronization components 104a, 104b). In contrast, during a stub synchronization replication, stub metadata and data from the local storage 106a of the source cluster 102a are sent to the target cluster 102b (e.g., via synchronization components 104a, 104b).

According to an embodiment, the setting components 202a, 202b can store and/or implement the following example settings: (i) Allow deep-copy: perform a stub synchronization replication whenever possible (e.g., for stub files with versions supported by both clusters 102a, 102b) and perform a deep-copy synchronization whenever required (e.g., for files with versions that are not commonly supported by both clusters 102a, 102b); (ii) Deny deep-copy: perform a stub synchronization replication whenever possible (e.g., for stub files with versions supported by both clusters 102a, 102b) and do not replicate files with versions that are not commonly supported by both clusters 102a, 102b (e.g., job failure); (iii) Force deep-copy: perform a deep-copy replication for all files including compatible files (e.g., stub files with versions supported by both clusters 102a, 102b); etc. Additionally or optionally, a default setting can also be provided.

In one example, based on the settings selected by the setting component 202a (and/or on-disk format versions supported by the source cluster 102a and the target cluster 102b, on-disk format version of a file, etc.), the synchronization component 104a can facilitate the appropriate replication of files from the source cluster 102a to the target cluster 102b. It is noted that during an initial synchronization, all the data stored within local storage 106a can be copied to local storage 106b; however, during each subsequent synchronization, only modifications to the data and/or new data are copied.

Figure 3:
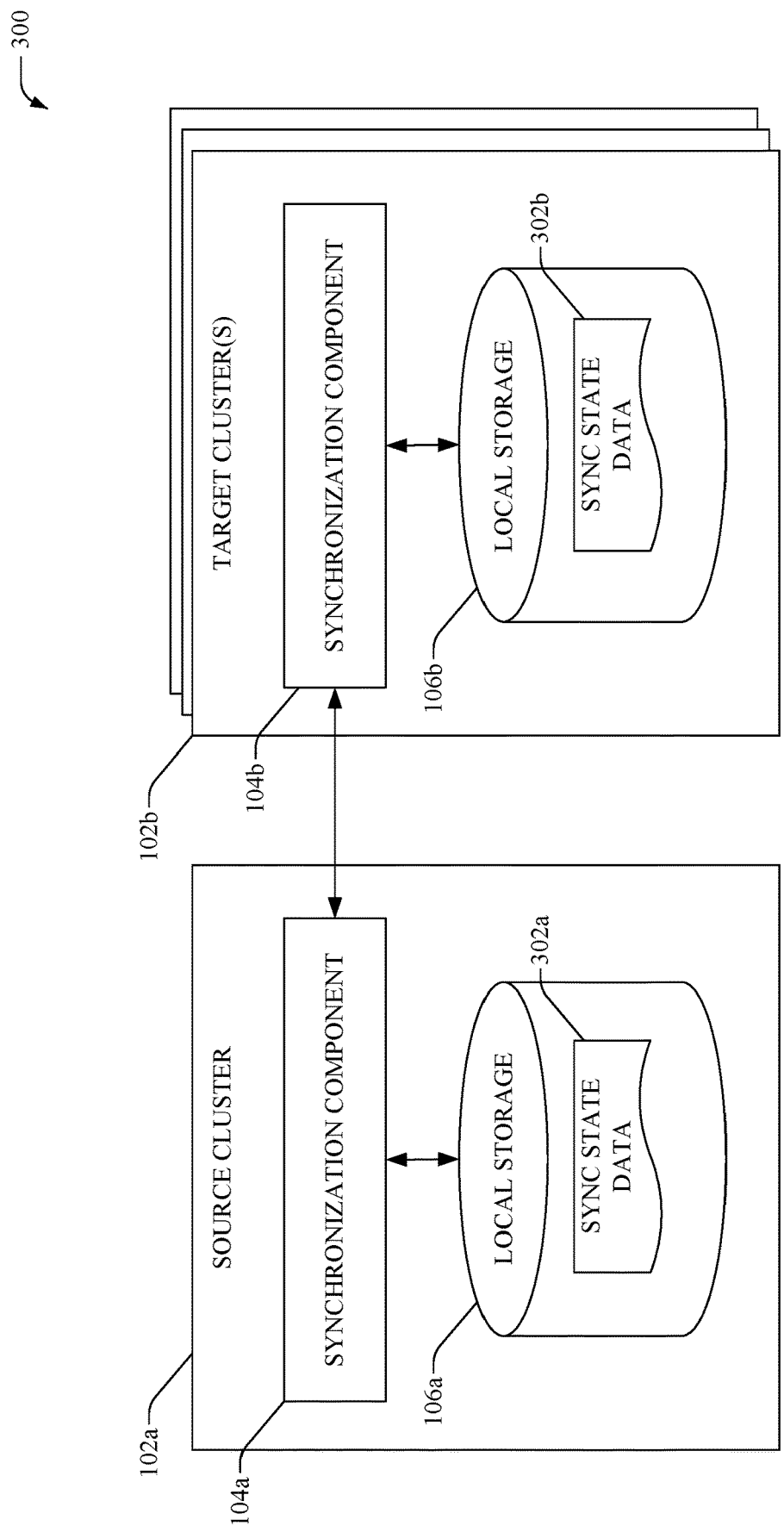
FIG. 3 illustrates an example system that facilitates determining a type of replication that is to be performed between clusters based on synchronization state data.

Referring now to FIG. 3, there illustrated is an example system 300 that facilitates determining a type of replication that is to be performed between clusters based on synchronization (sync) state data, according to an aspect of the subject disclosure. System 300 employs sync type (e.g., deep-copy, stub synchronization, etc.) previously performed on a file in order to determine what type of replication is presently required. It is noted that the source cluster 102a, target cluster(s) 102b, synchronization component 104a, synchronization component 104b, local storage 106a, and local storage 106b can include functionality as more fully described herein, for example, as described above with regard to systems 100-200.

According to an aspect, sync state data 302a, 302b that comprises a per-file previous sync type can be persisted and kept current on both source and target clusters 102a, 102b. In one example, the sync state data 302a, 302b can be stored within a replication state structure (restate) in a System B-Tree (SBT) that is employed to provide information about a current state of the file (e.g., stub files 108a, 108b; local files 110a, 110b). Typically, during an initial synchronization, the synchronization component 104a can populate a "base" restate that contains information about all files in the dataset. During subsequent incremental synchronizations, the synchronization component 104a can populate an "incremental" repstate that contains information about all files changed since the last synchronization job. At the end of an incremental sync, the synchronization component 104a can apply all incremental repstate entries to the base repstate. Further, the synchronization component 104a can mirror the entries to the target cluster 102b via the synchronization component 104b. The mirrored entries can be stored as sync state data 302b within local storage 106b.

In one example, to efficiently utilize disk space, only files with the previous sync type set to deep-copy shall be stored in the sync state data 302a, 302b. The absence of an entry for a file indicates that the sync type used was stub synchronization. An example on-disk format of the structure described above shall be as follows:
struct cpools_sync_state_ondisk_v1
{
　uint16_t ver;
　uint16_t sync_type;
}
struct cpools_sync_state
{
　enum isi_cbm_backup_sync_type_sync_type;
}
It is noted that the subject specification is not limited to the above example structure and most any structure format can be employed.

In one embodiment, the sync state data 302a, 302b can be utilized to facilitate replication during a failback. During a failback, clients can be migrated back to the source cluster 102a from the target cluster 102b. Any changes made (e.g., updates to existing files or creation of new files) by the clients to the files on the target cluster 102b can be synchronized with the source cluster 102a prior to (or during) the migration. If stub files on the source cluster 102a were converted to local files on the target cluster 102b (e.g., by employing the deep-copy process) during a failover, the original stub files can be retained on source cluster 102a during failback and only changes to the files can be communicated back. Moreover, during failback, the synchronization component 104b can employ the sync state data 302b to determine the last type of synchronization performed for a file. If determined that stub synchronization had been performed last, the synchronization component 104b can perform another stub synchronization to communicate the changes made to the file from the target cluster 102b to the source cluster 102a. Alternatively, if determined that a deep-copy had been performed last, the synchronization component 104b can update content (e.g., retained in cloud storage) referenced by the stub file on the source cluster 102a with the changes that were made to the file on the target cluster 102b.

Figure 4:
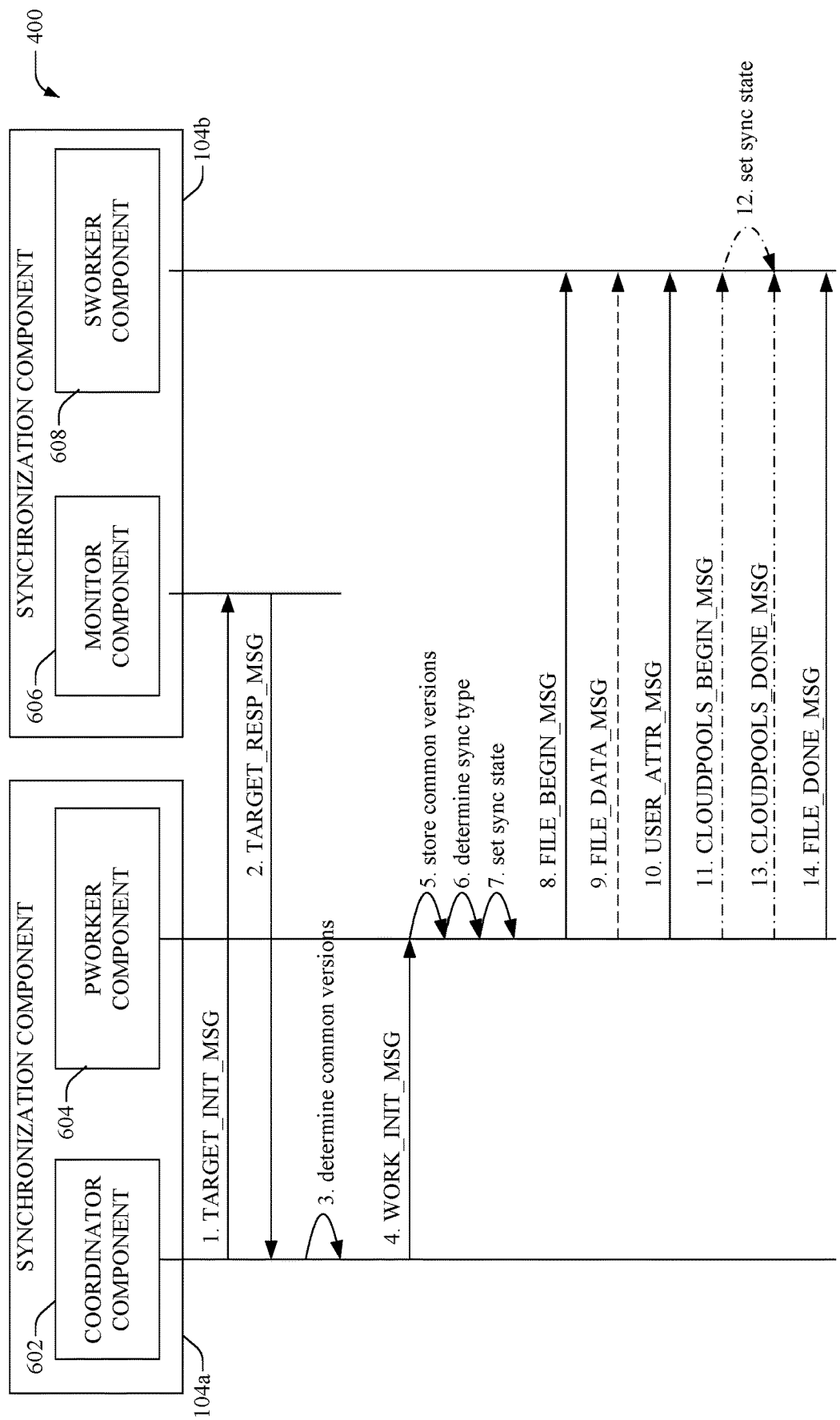
FIG. 4 illustrates an example call flow diagram that depicts a synchronization of file data between two clusters.
Figure 5:
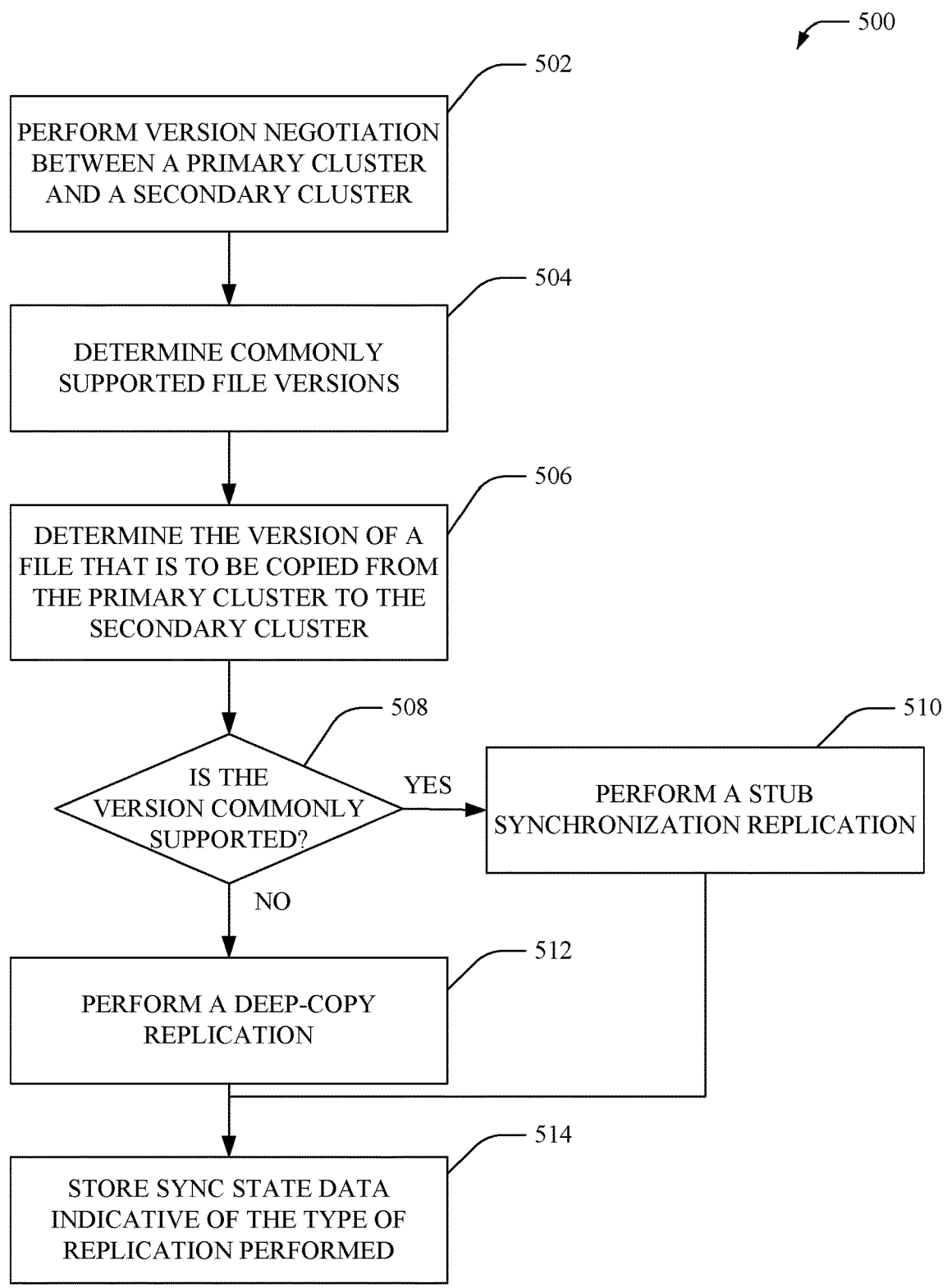
FIG. 5 illustrates an example method that facilitates performing different types of data replication based on stub file version data without configuration constraints on the type of replication to be performed.
Figure 6:
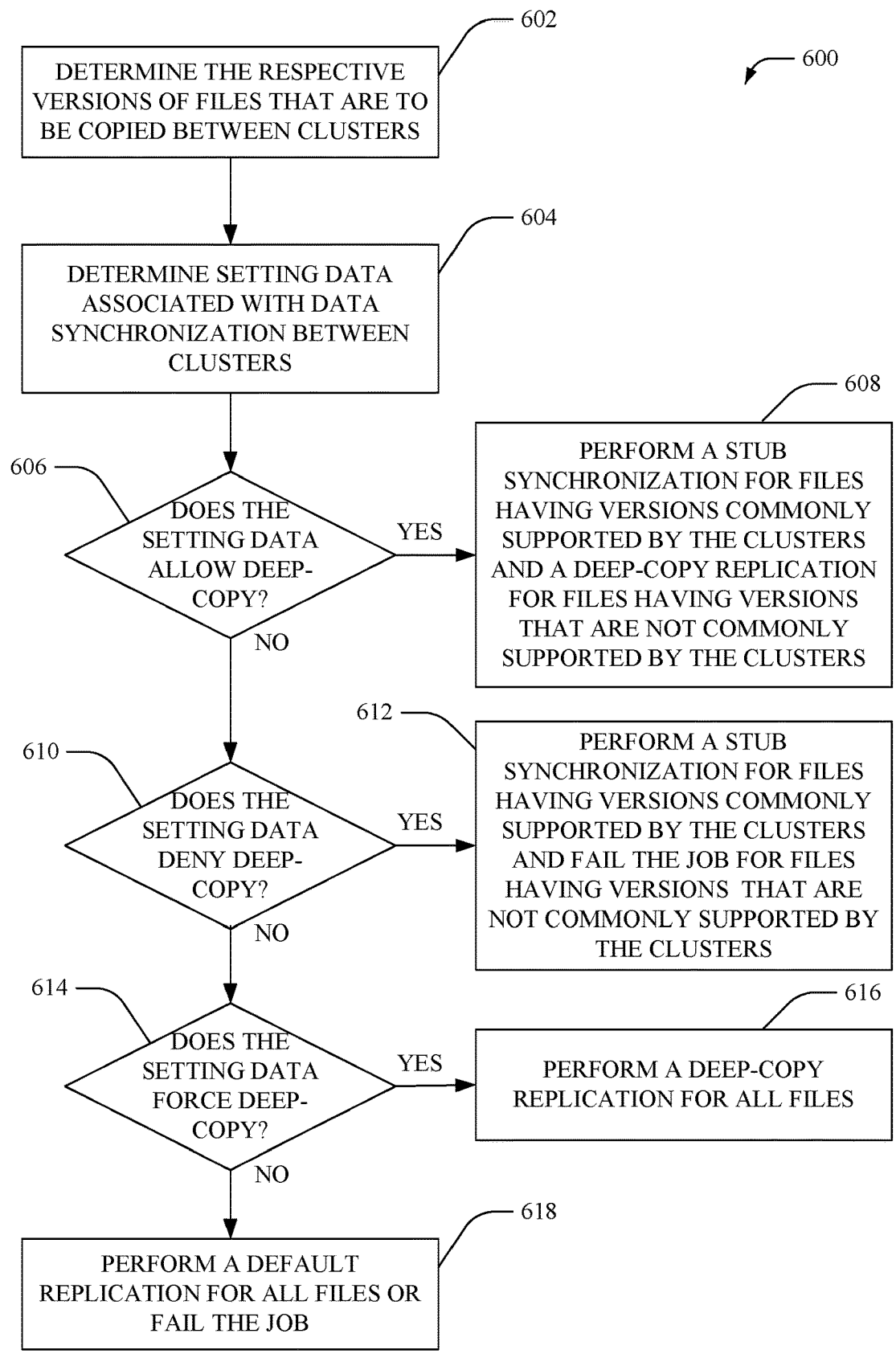
FIG. 6 illustrates an example method that facilitates configuration of replication between clusters of a distributed file storage system that employs tiered cloud storage.

FIGS. 4-6 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 4, there illustrated is an example call flow diagram 400 that depicts a synchronization of file data between two clusters, according to an aspect of the subject disclosure. In one example, a coordinator component 602 and a pworker component 604 can be part of (or implemented via) the synchronization component 104a of a source cluster. Further, monitor component 606 and sworker component 608 can be part of (or implemented via) the synchronization component 104b of a target cluster. It is noted that the synchronization component 104a and the synchronization component 104b can include functionality as more fully described herein, for example, as described above with regard to systems 100-300.

At (1), to initiate synchronization between clusters, the coordinator component 602 can transmit an initialization message, for example, a TARGET_INIT_MSG message to the monitor component 606. The TARGET_INIT_MSG message can include version data that represents versions of stub files supported by the source cluster. In response, at (2), the monitor component 606 can transmit a response message, for example, a TARGET_RESP_MSG message that can include version data that represents versions of stub files supported by the target cluster. In one example, both coordinator component 602 and the monitor component 606 can determine their supported version range by calling a function, for example, a isi_cbm_file_versions_create( ) function, then serializing the versions by calling a function, for example, a isi_cbm_file_versions_serialize( ) function, and finally packing the serialized buffer into the initialization message (e.g., TARGET_INIT_MSG) and the response message (e.g., TARGET_RESP_MSG) respectively.

At (3), based on performing a set intersect between the source and target supported versions, the coordinator component 602 can determine a common version range supported by both the source and target clusters. At (4), the coordinator component 602 can send the common version range to the pworker component 604, for example, via a WORK_INIT_MSG message. At (5), the pworker component 604 can store the version range within its context. Further, at (6), the pworker component 604 can determine a sync type that is to be performed for a specific file. As an example, the determination of the sync type can be based on the version of the file, defined setting(s), and/or previous sync type information. At (7), the pworker component 604 can set sync state data to reflect the type of replication that is to be performed for the file. As an example, the sync state data can be employed during failback to determine the type of replication performed during the latest (last) synchronization.

At (8), the pworker component 604 can send a message to initiate synchronization, for example, a FILE_BEGIN_MSG, to the sworker component 608. In one aspect, the FILE_BEGIN_MSG can comprise data (e.g., a flag) that indicates the sync type (e.g., stub sync or deep-copy) in effect for the file for the synchronization. If determined that a deep-copy process is to be performed, at (9), a message (e.g., FILE_DATA_MSG) comprising content referenced by the file (e.g., stored in a remote cloud storage) can be transferred from the pworker component 604 to the sworker component 608. It is noted that the entire content can be transferred during an initial synchronization and only updates can be transferred during subsequent synchronizations of the file. Additionally or optionally, at (10), new user attributes associated with the file can be transferred from the pworker component 604 to the sworker component 608 via one or more messages (e.g., a USER_ATTR_MSG message). In an alternate embodiment, if determined that a stub synchronization process is to be performed, the content references by the file (e.g. FILE_DATA_MSG) is not sent to the sworker component 608. Instead, from (11) to (13), one or more messages (e.g., CLOUDPOOLS_BEGIN_MSG and CLOUDPOOLS_DONE_MSG) are utilized to transfer stub data (and metadata) from the pworker component 604 to the sworker component 608. As the stub data is being (or has been) transferred, at (12), the sworker component 608 can set sync state data to reflect that a stub synchronization process has been performed for the file. At (14), a message (e.g., FILE_DONE_MSG) can be sent from the pworker component 604 to the sworker component 608 to indicate that the synchronization for the file is complete. It is noted that the subject specification is not limited to the above noted message identifiers and/or function identifiers and that most any message/function identifiers and/or messaging protocols can be employed to facilitate transfer of data between the different components.

FIG. 5 illustrates an example method 500 that facilitates performing different types of data replication based on stub file version data, according to an aspect of the subject disclosure. As an example, method 500 can be implemented by one or more network devices of a distributed file storage system that employs tiered cloud storage. Moreover, the method 500 facilitates performing the different types of data without configuration constraints on the type of replication to be performed. At 502, version negotiation can be performed between a primary cluster and a secondary (e.g., backup) cluster. As an example, during version negotiation, the primary and secondary clusters can exchange one or more messages that indicate whether the clusters support stub files and/or if they support stub files, versions of stub files that are supported by the clusters. At 504, commonly supported versions can be determined (e.g., by employing a set intersect function).

Further, a per-file basis synchronization to facilitate a replication of files of the primary cluster to the secondary cluster can be initiated. At 506, a version of a file that is to be copied from the primary cluster to the secondary cluster can be determined. At 508, it can be determined whether the version of the file is commonly supported by both the clusters. In one aspect, if determined that the version of the file is commonly supported, then at 510, a stub synchronization process can be performed. As an example, the stub synchronization process includes replication of only the metadata (e.g., control structures, account information, provider information, policy information etc.) and cached data (if any) in the stub file from the primary cluster to the secondary cluster. Moreover, after a first initial synchronization that copies the stub to the secondary cluster, only updates made to the stub are transferred between the primary cluster and the secondary cluster.

In another aspect, if determined that the version of the file is not commonly supported, then at 512, a deep-copy process can be performed. As an example, the deep-copy process includes retrieving a copy of the content referenced by the stub file that is stored in remote cloud storage and transferring the copy of the content to the secondary cluster that in turn can save the content as a local file. Moreover, after a first initial synchronization that copies the content to the secondary cluster, only updates made to the content can be transferred between the primary cluster and the secondary cluster. At 514, sync state data indicative of the type of replication (e.g., deep-copy replication or stub synchronization replication) that has been performed for the file can be stored. In one aspect, the sync state data can be utilized during failback to accurately transfer, to the primary cluster, modifications made to the file on the secondary cluster. For example, if a stub file on the primary cluster has been replicated as a local file on the secondary cluster by employing a deep-copy process, during fall back the target cluster can determine that the file is represented as a stub file on the primary cluster and can accordingly transfer updates back to the file and/or content referenced by the file (e.g., stored within cloud storage).

FIG. 6 illustrates an example method 600 that facilitates configuration of replication between clusters of a distributed file storage system that employs tiered cloud storage, according to an aspect of the subject disclosure. As an example, method 600 can be implemented by a primary cluster prior to synchronization with one or more secondary clusters. At 602, the respective versions of files that are to be copied between the clusters can be determined. As an example, the versions can include different versions of stub files and/or a version indicating that the file is a local file. At 604, setting data associated with data synchronization between the clusters can be determined. In one aspect, the setting data can be defined by an operator and/or client.

At 606, it can be determined whether the setting data allows deep-copy of files. If determined that the setting data indicates that deep-copy of files is allowed, then at 608, a stub synchronization is performed for files having versions that are commonly supported by the clusters and a deep-copy replication is performed for files having versions that are not commonly supported by the clusters. Further, at 610, it can be determined whether the setting data denies deep-copy of files. If determined that the setting data indicates that deep-copy of files is denied, then at 612, a stub synchronization is performed for files having versions that are commonly supported by the clusters and a replication is not performed for files having versions that are not commonly supported by the clusters (e.g., a job failure notification can be provided to the operator and/or client). Furthermore, 614, it can be determined whether the setting data forces a deep-copy of files. If determined that the setting data indicates that deep-copy of files is forced, then at 612, a deep-copy is performed for all files. If the setting data has not been defined to state whether deep-copy is allowed, denied, or forced, at 618, a default setting for replication can be utilized for all files or the replication job can be failed.

Figure 7:
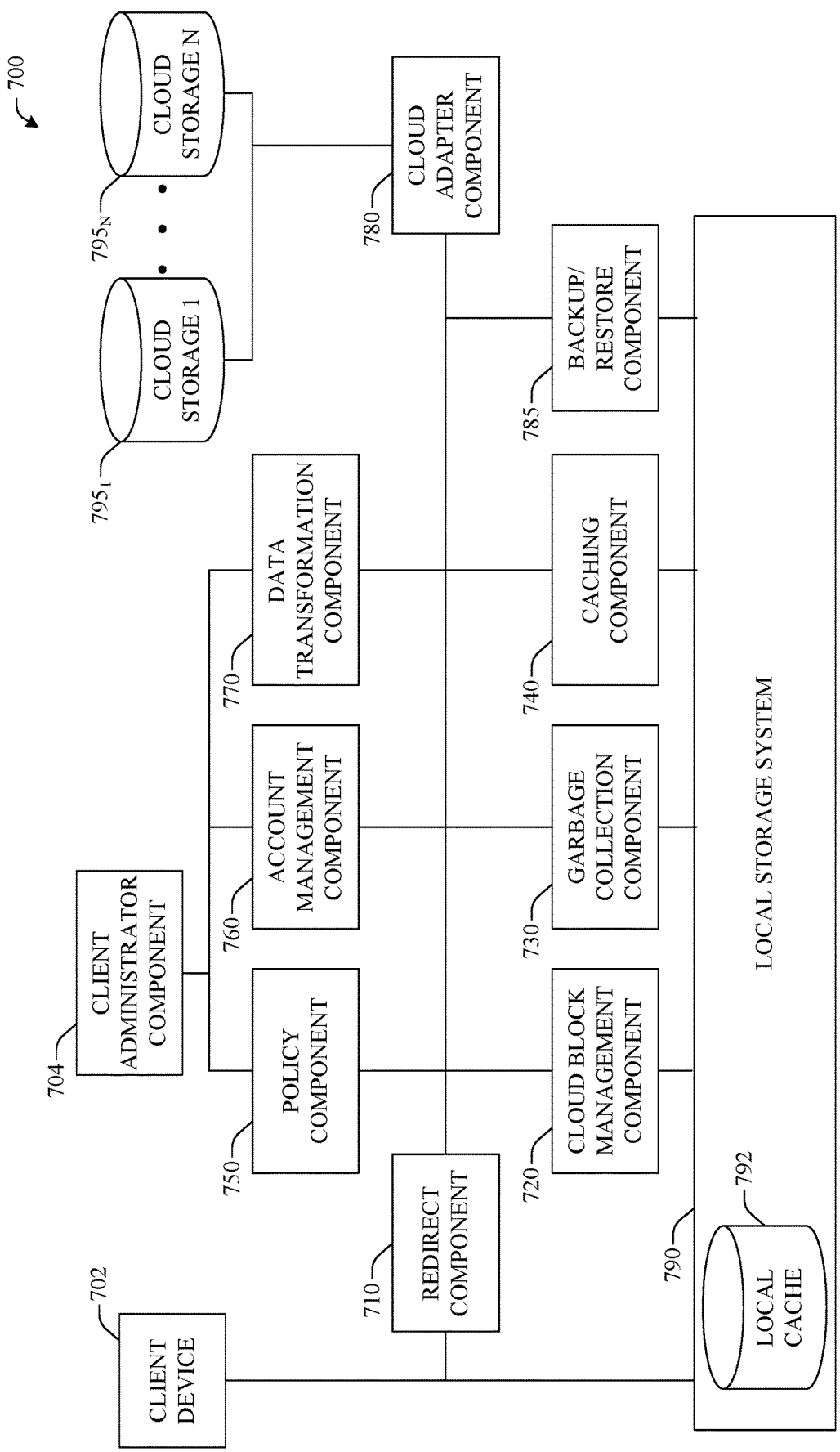
FIG. 7 illustrates a block diagram of an example distributed file storage system that employs tiered cloud storage.
Figure 8:
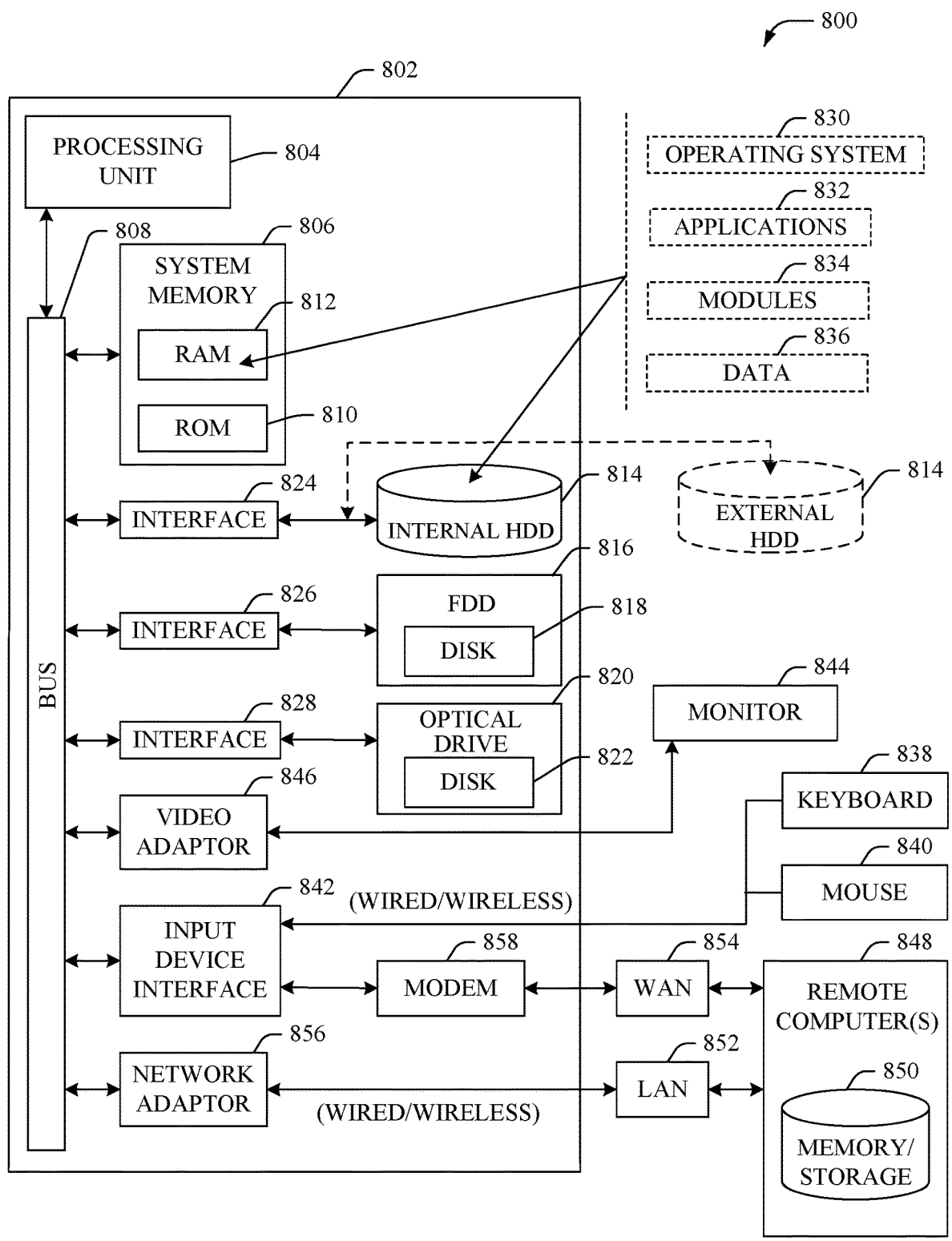
FIG. 8 illustrates a block diagram of an example computer operable to execute the disclosed communication architecture.

To provide further context for various aspects of the subject specification, FIGS. 7 and 8 illustrate, respectively, a block diagram of an example distributed file storage system 700 that employs tiered cloud storage and block diagram of a computer 800 operable to execute the disclosed storage architecture in accordance with aspects described herein.

Referring now to FIG. 7, there is illustrated an example local storage system including cloud tiering components and a cloud storage location in accordance with implementations of this disclosure. Client device 702 can access local storage system 790. Local storage system 790 can be a node and cluster storage system such as an EMC Isilon Cluster that operates under OneFS operating system. Local storage system 790 can also store the local cache 792 for access by other components. It can be appreciated that the systems and methods described herein can run in tandem with other local storage systems as well.

As more fully described below with respect to redirect component 710, redirect component 710 can intercept operations directed to stub files. Cloud block management component 720, garbage collection component 730, and caching component 740 may also be in communication with local storage system 790 directly as depicted in FIG. 7 or through redirect component 710. A client administrator component 704 may use an interface to access the policy component 750 and the account management component 760 for operations as more fully described below with respect to these components. Data transformation component 770 can operate to provide encryption and compression to files tiered to cloud storage. Cloud adapter component 780 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 797 can be utilized to backup the files stored within the local storage system 790.

Cloud block management component 720 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 720 in chunks of data. A uniform chunk size can be selected where all files that tiered to cloud storage can be broken down into chunks and stored as individual cloud objects per chunk. It can be appreciated that a large chunk size can reduce the amount of objects needed to represent a file in cloud storage; however, a large chunk size can decrease the performance of random writes.

The account management component 760 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 720 based on list of mappings it manages. For example, each stub can be associated with an account, and the cloud block management component 720 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 780 manages the sending and receiving of data to and from the cloud service providers. The cloud adapter component 780 can utilize a set of API. For example, each cloud service provider may have provider specific API to interact with the provider.

A policy component 750 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 730. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 730 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 740 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 720, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 740 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 740 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 770 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 797 can transfer a copy of the files within the local storage system 790 to another cluster (e.g., target cluster). Further, the backup/restore component 797 can manage synchronization between the local storage system 790 and the other cluster, such that, the other cluster is timely updated with new and/or modified content within the local storage system 790. As an example, the backup/restore component 797 can comprise the synchronization component 104*a*, setting component 202*a*, and/or network interface component 204*a*.

Referring now to FIG. 8, there is illustrated a block diagram of a computer 802 operable to execute the disclosed communication architecture. In order to provide additional context for various aspects of the disclosed subject matter, FIG. 8 and the following discussion are intended to provide a brief, general description of a suitable computing environment 800 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 8, the example environment 800 for implementing various aspects of the specification includes a computer 802, the computer 802 including a processing unit 804, a system memory 806 and a system bus 808. As an example, the component(s), server(s), node(s), cluster(s), system(s), and/or device(s) (e.g., source cluster 102a, target cluster(s) 102b, synchronization component 104a, synchronization component 104b, setting component 202a, setting component 202b, network interface component 204a, network interface component 204b, coordinator component 602, pworker component 604, monitor component 606, sworker component 608, client device 702, client administrator component 704, cloud block management component 720, garbage collection component 730, caching component 740, policy component 750, account management component 760, data transformation component 770, cloud adapter component 780, local storage system 790, etc.) disclosed herein with respect to systems 100-300 and 700 can each include at least a portion of the computer 802. The system bus 808 couples system components including, but not limited to, the system memory 806 to the processing unit 804. The processing unit 804 can be any of various commercially available processors. Dual microprocessors and other multiprocessor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814, which internal hard disk drive 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the specification can be implemented with various commercially available operating systems or combinations of operating systems.

A user can enter commands and information into the computer 802 through one or more wired/wireless input devices, e.g., a keyboard 838 and/or a pointing device, such as a mouse 840 or a touchscreen or touchpad (not illustrated). These and other input devices are often connected to the processing unit 804 through an input device interface 842 that is coupled to the system bus 808, but can be connected by other interfaces, such as a parallel port, an IEEE 1394 serial port, a game port, a USB port, an infrared (IR) interface, etc. A monitor 844 or other type of display device is also connected to the system bus 808 via an interface, such as a video adapter 846.

The computer 802 can operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 is connected to the local network 852 through a wired and/or wireless communication network interface or adapter 856. The adapter 856 can facilitate wired or wireless communication to the LAN 852, which can also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are example and other means of establishing a communications link between the computers can be used.

The computer 802 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   storing, within a source cluster device of a first cluster of nodes, a stub file, wherein the stub file is a remnant of a file in the source cluster device after data content of the file has been moved to a remote network-based storage device;
   determining that a first stub file version of a first stub file indicates that a first cluster device of a first cluster of nodes supports cloud-tiered files and a second stub file version of a second stub file indicates that a second cluster device of a second cluster of nodes does not support cloud-tiered files, wherein the cloud-tiered files comprise files retained within a group of remote cloud storage devices in which data is tiered to the first cluster device, wherein the second cluster of nodes are nodes that are employable to provide redundancy to avoid a data loss subsequent to a failure event associated with the first cluster of nodes, wherein the first stub file version is indicative of a first data structure of mandatory metadata contained in the first stub file, the first data structure of mandatory metadata comprising a mapinfo data structure that indicates how on-cloud data is interpreted and a cacheinfo data structure that indicates how on-disk data is interpreted, and wherein the second stub file version is indicative of a mandatory second data structure of metadata contained in the second stub file; and
   based on a comparison of a first feature of the first stub file version that is supported by the target cluster device and a second feature of the second stub file version of the stub file, determining a type of replication that is to be performed to copy the stub file to the target cluster device.

2. The system of claim 1, wherein the determining the type of replication comprises:
   in response to determining that the first stub file version that is supported by the target cluster device differs from the second stub file version of the stub file, performing a deep copy of the stub file, wherein the deep copy comprises a replication of at least a portion of the data content referenced by the stub file from the remote network-based storage device to the target cluster device.

3. The system of claim 2, wherein at least the portion of the data content comprises at least the portion of the data content that has been modified subsequent to an initial synchronization between the source cluster device and the target cluster device.

4. The system of claim 1, wherein the determining the type of replication comprises:
   in response to determining that the first stub file version that is supported by the target cluster device matches the second stub file version of the stub file, performing a stub synchronization of the stub file, wherein the stub synchronization comprises a replication of at least a portion of stub data retained within the source cluster device to the target cluster device, without replicating data content referenced by the stub file from the remote network-based storage device to the target cluster device.

5. The system of claim 4, wherein at least the portion of the stub data comprises at least a portion of the data content referenced by the stub file that has been cached within the source cluster device.

6. The system of claim 1, wherein the determining the type of replication comprises determining the type of replication based on defined setting data.

7. The system of claim 6, wherein the defined setting data indicates that a deep copy is to be performed for the stub file, and wherein the deep copy comprises a replication of the data content from the remote network-based storage device to the target cluster device.

8. The system of claim 1, wherein during an occurrence of the failure event associated with the source cluster device, the target cluster device is accessible to a client device, and based on input data received from the client device, information retained within the target cluster device is modified, and wherein the operations further comprise:
   in response to a resolution of the failure event and based determining to perform a deep copy, facilitating a transmission of change data from the target cluster device to the source cluster device, and wherein the change data represents a modification to the information that is generated based on the input data.

9. The system of claim 1, wherein the second stub file version of the stub file identifies a capability of the stub file, the capability comprising an indication of a cloud storage provider that the stub file is operable with.

10. The system of claim 1, wherein the second stub file version of the stub file identifies a compression scheme utilized by the stub file or an encryption scheme utilized within the stub file.

11. The system of claim 1, wherein the comparison of the first stub file version that is supported by the target cluster device and the second stub file version of the stub file identifies that the first stub file version and the second stub file version match, and wherein a first metadata structure of the first stub file version and a second metadata structure of the second stub file version match.

12. The system of claim 1, wherein the comparison of the first stub file version that is supported by the target cluster device and the second stub file version of the stub file identifies that the first stub file version and the second stub file version differ, and wherein a first metadata structure of the first stub file version and a second metadata structure of the second stub file version differ.

13. The system of claim 1, wherein the operations further comprise:
sending a first message from the source cluster device to the target cluster device, the first message being indicative of initiating synchronization between the source cluster device and the target cluster device;
in response to sending the first message, receiving a second message, by the source cluster device and from the target cluster device, the second message being indicative of one or more versions of stub files that are supported by the target cluster device; and
determining that the first stub file version is supported by the target cluster device of the second cluster of nodes.

14. A method, comprising:
determining, by a system comprising a processor, that a first stub file version of a first stub file indicates that a first cluster device of a first cluster of nodes supports cloud-tiered files and a second stub file version of a second stub file indicates that a second cluster device of a second cluster of nodes does not support cloud-tiered files, wherein the cloud-tiered files comprise files retained within a group of remote cloud storage devices in which data is tiered to the first cluster device, wherein the second cluster of nodes are nodes that are employable to provide redundancy to avoid a data loss subsequent to a failure event associated with a first cluster of nodes, wherein the first stub file version is indicative of a first data structure of mandatory metadata contained in the first stub file, the first data structure of mandatory metadata comprising a mapinfo data structure that indicates how on-cloud data is interpreted and a cacheinfo data structure that indicates how on-disk data is interpreted, and wherein the second stub file version is indicative of a mandatory second data structure of metadata contained in the second stub file; and
based on a comparison of the first stub file version that is supported by the target cluster device and the second stub file version of the second stub file, and based on a first feature comprising at least one of an indication of a provider of the first stub file version, an encryption scheme used in the first stub file version, or a compression scheme used in the first stub file version, determining, by the system, a type of synchronization operation that is to be performed to copy the first stub file from the source cluster device to the target cluster device.

15. The method of claim 14, wherein the determining the type of synchronization operation comprises:
determining, by the system, that a deep copy operation is to be performed in response to determining that the first stub file is not compatible with the target cluster device, and wherein the deep copy operation comprises copying data content of the first stub file from the remote network-based storage device to the target cluster device.

16. The method of claim 14, wherein the determining the type of synchronization operation comprises:
determining, by the system, that a stub synchronization operation is to be performed in response to determining that the first stub file is compatible with the target cluster device, and wherein the stub synchronization operation comprises copying a control structure of the first stub file from the source cluster device to the target cluster device.

17. The method of claim 14, further comprising:
sending, by the system, a first message from the source cluster device to the target cluster device, the first message being indicative of initiating synchronization between the source cluster device and the target cluster device;
in response to sending the first message, receiving a second message, by the source cluster device and from the target cluster device, the second message being indicative of one or more versions of stub files that are supported by the target cluster device; and
determining, by the system, that the first stub file version is supported by the target cluster device of the second cluster of nodes.

18. A non-transitory computer-readable medium comprising instructions that, in response to execution, cause a device comprising a processor to perform operations, comprising:
determining that a first stub file version of a first stub file indicates that a first cluster device of a first cluster of nodes supports cloud-tiered files and a second stub file version of a second stub file indicates that a second cluster device of a second cluster of nodes does not support cloud-tiered files, wherein the cloud-tiered files comprise files retained within a group of remote cloud storage devices in which data is tiered to the first cluster device, wherein the second cluster of nodes are nodes that are employable to provide redundancy to avoid a data loss subsequent to a failure event associated with the first cluster of nodes, wherein the first stub file version is indicative of a first data structure of mandatory metadata contained in the first stub file, the first data structure of mandatory metadata comprising a mapinfo data structure that indicates how on-cloud data is interpreted and a cacheinfo data structure that indicates how on-disk data is interpreted, and wherein the second stub file version is indicative of a mandatory second data structure of metadata contained in the second stub file; and
based on a comparison of a first feature of the first stub file version and a second feature of the second stub file version, facilitating a synchronization between the first cluster device and the second cluster device, the first feature comprising at least one of an indication of a provider of the first stub file version, an encryption scheme used in the first stub file version, or a compression scheme used in the first stub file version, wherein the synchronization comprises copying at least a portion of the files from the group of remote cloud storage devices to the second cluster device and retaining at least the portion of the files within the second cluster device as one or more non-tiered files.

19. The non-transitory computer-readable medium of claim 18, wherein the facilitating comprises facilitating the synchronization based on defined policy data.

20. The non-transitory computer-readable medium of claim 18, wherein the operations further comprise:
subsequent to the synchronization, storing type data indicative of a category of a first replication utilized for the synchronization, wherein the type data is employable facilitate a second replication during a failback.

* * * * *